Aug. 23, 1927.
A. S. WELLS
1,639,914
DENTAL INSTRUMENT
Filed Aug. 27, 1925
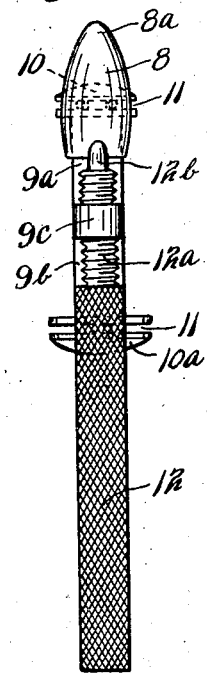
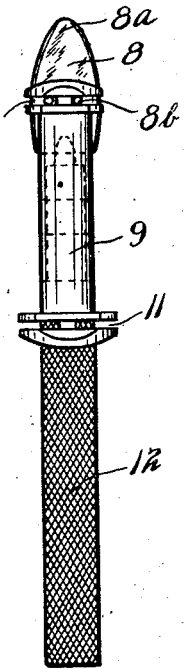
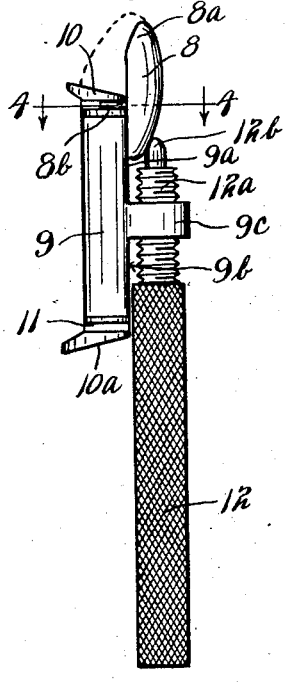
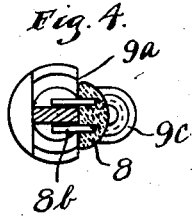
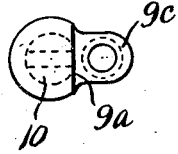
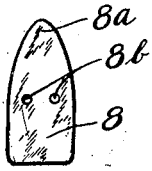
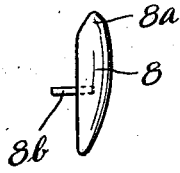
INVENTOR.
AMOS S. WELLS.
BY HIS ATTORNEYS.

Patented Aug. 23, 1927.

1,639,914

UNITED STATES PATENT OFFICE.

AMOS S. WELLS, OF MINNEAPOLIS, MINNESOTA.

DENTAL INSTRUMENT.

Application filed August 27, 1925. Serial No. 52,789.

This invention relates to dental tools for forming or building on the tip portions of artificial teeth.

The tip portion of the tooth is built up from the upper end of a standard tooth facing to conform to the recess in the gums to which it is to be applied.

It is important that the built-up tip be carefully and accurately made to conform to the shape of the cavity in order that the tissue engaging the same will be uniformly engaged.

This invention has for its main object to provide an extremely simple but highly efficient dental tool especially adapted for holding the teeth facings and building the tips thereon, provision being made for molding the bottom portion of the built-on tip at the proper angle to the adjacent side of the facing, to permit the tooth to be properly assembled in the bridge or other device used for retaining the teeth in the mouth.

It is a further object of the invention to provide a tool of the above described class having means for securely holding a standard tooth facing against both lateral and longitudinal displacement and having a supporting surface disposed at an angle to a tooth or facing held by the instrument, on which a tip may be built-up.

A further object of the invention is to provide a tool having a retaining member provided with a flat surface adjacent either extremity and longitudinally disposed thereof and having at each extremity a supporting surface at an angle to its adjacent abutting surface, said supporting surfaces being correctly shaped to build the tip portion of an artificial tooth thereon, and being, also, of different sizes, whereby, by reversing said retaining member, either supporting surface may be employed as desired, according to the size of the tooth to be built up.

It is a more specific object to provide in such a device a retaining member having means thereon for engaging the spaced pins or prongs projecting from one side of a standard flat-backed tooth and having a longitudinally movable manipulating handle and clamping device carried by said retaining member and having threaded engagement therewith.

These and other objects of the invention will be apparent from the following description made in connection with the accompanying drawings, wherein like characters refer to similar parts throughout the several views, and in which—

Fig. 1 is a front elevation on an enlarged scale of the tool with a tooth facing held thereon;

Figs. 2 and 3 are back and side elevations, respectively, of the same;

Fig. 4 is a cross section taken on the line 4—4 of Fig. 3;

Fig. 5 is a plan view of the retaining member detached;

Fig. 6 is a rear elevation of a standard flat-backed tooth facing detached; and

Fig. 7 is a side elevation of the same.

In the drawings, a standard flat-backed tooth facing is indicated by the numeral 8 having the tip portion $8^a$, and carrying the transversely spaced projecting pins or lugs $8^b$ disposed normal to the back face or side thereof. These pins $8^b$ are employed to secure the tooth to the bridge, the built-up portion of the tip indicated by the dotted lines in Fig. 3, spaced slightly thereabove to permit the metal strip of the bridge to be secured flat against the back portion of the tooth.

In the preferred form of the invention, a substantially semi-cylindrical retaining member 9 is provided, having the longitudinally disposed flat abutting surfaces $9^a$ and $9^b$ disposed in the same plane and adjacent, respectively, the opposite extremities of said member.

At the two extremities of member 9, flat substantially semi-circular supporting surfaces 10 and $10^a$, respectively, are provided, each disposed at an angle to the adjacent abutting surface above described. The angle of each of the supporting surfaces 10 and $10^a$, with the adjacent abutting surface, is approximately the same, being preferably slightly greater than 90 degrees, and supporting surface $10^a$ is substantially larger than surface 10.

Retaining member 9 is slightly enlarged at either end and a pair of spaced parallel grooves 11 are formed extending substantially normal to abutting surfaces $9^a$ and $9^b$, and at each side of member 9, being adapted to engage the spaced pins $8^b$ of a tooth facing to retain the same against longitudinal displacement. Intermediate of member 9, and carried at its front side, is an apertured lug 9ᶜ threaded to engage the threaded portion 12ᵃ of a clamping member 12. Member 12 carries at its upper extremity, the rounded tip 12ᵇ adapted to engage the front side of the lower portion of a tooth facing, as illustrated in Fig. 3. The lower end of member 12 is knurled to form a manipulating handle for the tool.

Obviously, member 12 may be quickly unscrewed from the lug 9ᵇ and reversed, whereby the opposite extremity of the tool may be employed. Thus, if a larged sized tooth is used, the larger supporting surface will be disposed at the top of the tool whereon the tip may be built.

In operation, the facing 8 is engaged by the retaining member 9, pins 8ᵇ fitting in the slots 11 in the extremity of the member desired to be utilized, and the clamping member 12 is screwed up until the lower portion of the facing is securely clamped with the cooperation of the slots 11 and pins 8ᵇ, being there held against lateral, as well as longitudinal, displacement. The instrument with the tooth to be worked on, may then be held in one hand by means of handle 12, while the tip of the tooth may be built up, supported by the supporting surface 10 or 10ᵃ, the semi-circular shape of said surface serving as a guide to facilitate the building up of the tip. The bottom portion of the built-up tip is, of course, moulded at the correct angle by the supporting surface. The tips are built up from plastic material, such as porcelain, adapted to be subsequently baked and hardened.

The flat abutting surfaces 9ᵃ and 9ᵇ furnish a firm base of resistance for the facing and always hold the facing longitudinally of the tool with the tip portion thereof projecting beyond the upper extremity of the tool, the adjacent supporting surface 10 or 10ᵃ, as the case may be, being disposed transversely of and at an angle to the back of the facing retained.

Hitherto it has been exceedingly difficult to properly hold a tooth facing to enable the tip to be accurately and carefully built thereon as well as to mould the bottom portion of the tip at the right angle to the facing on which the same is built.

From the above description, it will be seen that applicant has invented an efficient though simple instrument, comprising only two parts and being reversible to permit tips of various sizes to be built on standard facings.

The device has been put to extensive actual usage and has been found highly efficient for the purposes enumerated.

It will, of course, be understood that various changes may be made in the form, details, arrangement and proportions of the parts without departing from the scope of applicant's invention, which, generally stated, consists in a device such as shown and described and defined in the appended claims.

What is claimed is:

1. A dental tool for building tips on artificial teeth having in combination retaining means for holding a tooth, and a supporting surface extending transversely at one side of the tooth when the latter is held in said means, on which surface a tip may be built up.

2. A dental tool for building tips on artificial teeth, said tool having a surface adapted to abut one side of a tooth and having a supporting surface at an angle to said surface on which the tip of a tooth may be built up.

3. A dental tool for building tips on artificial teeth, comprising a pair of adjustable retaining members adapted to hold a tooth with its tip projecting therebeyond, and a supporting surface carried by one of said members transversely of one side of a tooth held by said retaining members on which the tip may be built up, substantially as described.

4. A dental tool for building tips on artificial teeth, comprising a pair of clamping members relatively movable, longitudinally of each other, adapted to hold a tooth longitudinally disposed thereof with its tip projecting beyond said members, and a supporting surface at the extremity of one of said members at an angle to a tooth held in said members on which the tip may be built up and the bottom portion thereof molded, substantially as described.

5. A dental tool for building tips on artificial teeth, which teeth have one flat side having in combination, retaining means for holding a tooth against lateral displacement, means for preventing longitudinal displacement of said tooth, and a supporting surface at an angle to the flat surface a tooth held in the instrument on which the tip of the tooth may be built up, substantially as described.

6. A dental tool for building tips on artificial teeth, having retaining means adapted to hold a tooth longitudinally of the tool with the tip thereof projecting beyond one end of the tool, and a supporting surface at an angle to a tooth held in said instrument and immediately adjacent thereto, said surface being shaped to permit the tip of the tooth to be built thereon.

7. The structure set forth in claim 6, and said supporting surface being substantially semi-circular in shape.

8. A dental tool for building tips on artificial teeth, comprising a member having a flat longitudinally disposed abutting surface adjacent each of its extremities, a supporting surface at each of its extremities at an angle to its adjacent abutting surface, and a clamping member adapted to co-operate with either of said abutting surfaces to hold a tooth with its tip projecting beyond one of said supporting surfaces, substantially as and for the purposes described.

9. A dental tool for building tips on teeth facings, provided with a flat side and spaced projecting means at said side thereof, comprising, a retaining member having an abutting surface adapted to engage said side of the facing and having a central portion adapted to be straddled by said projecting means on the facing, a flat supporting surface at an angle to said abutting surface adapted to receive a tip, and a clamping member adapted to engage the opposite side of the facing to hold the same substantially as and for the purposes described.

10. A dental tool for building tips on teeth facings provided with a flat surface and spaced projecting pins at said side thereof, comprising, a retaining member having a substantially flat abutting surface adapted to engage said flat side of the facing, said surface being provided with spaced recesses open at the side extending substantially at right angles thereto, adapted to receive the spaced pins on said facings, a supporting surface at one end of said member extending at an angle to said abutting surface shaped to have a tip built thereon, and a clamping member movable longitudinally of said retaining member and carried thereby, adapted to engage the side of the facing opposite said flat side substantially as and for the purposes described.

11. The structure set forth in claim 10, and said clamping member carrying a manipulating handle on the outer end thereof.

In testimony whereof I affix my signature.

AMOS S. WELLS.